United States Patent
Song et al.

(10) Patent No.: US 8,724,004 B2
(45) Date of Patent: May 13, 2014

(54) MOBILE TERMINAL AND TAG EDITING METHOD THEREOF

(75) Inventors: Yoo-Mee Song, Seoul (KR);
Byung-Sang Yeo, Gyeonggi-Do (KR);
Seong-Yoon Cho, Seoul (KR);
Yee-Rang Yun, Seoul (KR); Hye-Youn Cho, Seoul (KR); Dong-Seok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 12/759,456

(22) Filed: Apr. 13, 2010

(65) Prior Publication Data

US 2011/0081952 A1 Apr. 7, 2011

(30) Foreign Application Priority Data

Oct. 1, 2009 (KR) ........................ 10-2009-0094139

(51) Int. Cl.
*H04N 5/222* (2006.01)
*H04B 1/38* (2006.01)

(52) U.S. Cl.
USPC ..................................... 348/333.12; 455/566

(58) Field of Classification Search
None
See application file for complete search history.

(56) References Cited

U.S. PATENT DOCUMENTS

| | | | |
|---|---|---|---|
| 5,633,678 A | 5/1997 | Parulski et al. | |
| 6,462,778 B1 | 10/2002 | Abram et al. | |
| 6,538,698 B1 | 3/2003 | Anderson | |
| 6,629,104 B1 | 9/2003 | Parulski et al. | |
| 7,973,824 B2 * | 7/2011 | Kawahara | 348/222.1 |
| 2003/0036411 A1 * | 2/2003 | Kraft | 455/566 |
| 2003/0218624 A1 | 11/2003 | Quintana et al. | |
| 2004/0174434 A1 | 9/2004 | Walker et al. | |
| 2004/0199581 A1 * | 10/2004 | Kucharewski et al. | 709/204 |
| 2005/0018057 A1 | 1/2005 | Bronstein et al. | |
| 2005/0105396 A1 | 5/2005 | Schybergson | |
| 2005/0151854 A1 | 7/2005 | Maki | |
| 2006/0110154 A1 | 5/2006 | Hulsen et al. | |
| 2006/0195506 A1 * | 8/2006 | Deng | 709/203 |
| 2006/0224433 A1 * | 10/2006 | Baek et al. | 705/9 |
| 2007/0167044 A1 | 7/2007 | Ogren | |
| 2009/0003797 A1 | 1/2009 | Nash | |
| 2009/0046933 A1 | 2/2009 | Gallagher et al. | |
| 2009/0232417 A1 | 9/2009 | McMahan | |
| 2009/0280859 A1 * | 11/2009 | Bergh | 455/556.1 |
| 2011/0064281 A1 * | 3/2011 | Chan | 382/118 |
| 2011/0249144 A1 * | 10/2011 | Chang | 348/231.3 |

FOREIGN PATENT DOCUMENTS

| | | |
|---|---|---|
| CN | 1739302 A | 2/2006 |
| CN | 101189621 A | 5/2008 |
| EP | 1507399 A1 | 2/2005 |

* cited by examiner

*Primary Examiner* — Luong T Nguyen
(74) *Attorney, Agent, or Firm* — Birch, Stewart, Kolasch & Birch, LLP

(57) ABSTRACT

A mobile terminal and its tag editing method are provided. The tag editing method of a mobile terminal includes operating a camera, displaying a preview image inputted via the camera on a preview screen, entering a tag editing mode from the preview screen, editing tag information in the tag editing mode, capturing an image by the camera after editing the tag information, tagging the edited tag information to the captured image to form a tagged image; and displaying the tagged image.

19 Claims, 26 Drawing Sheets

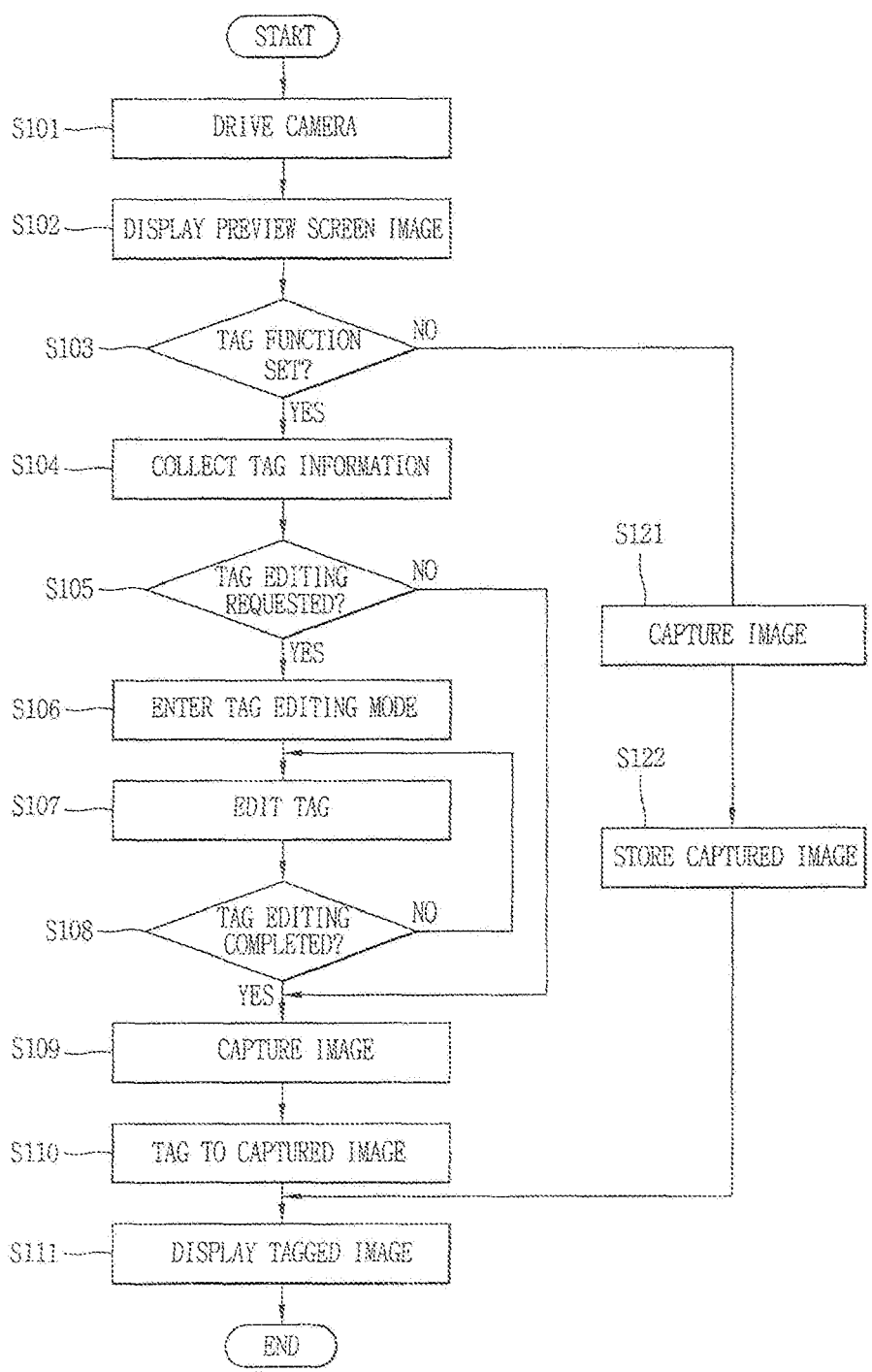

FIG. 13
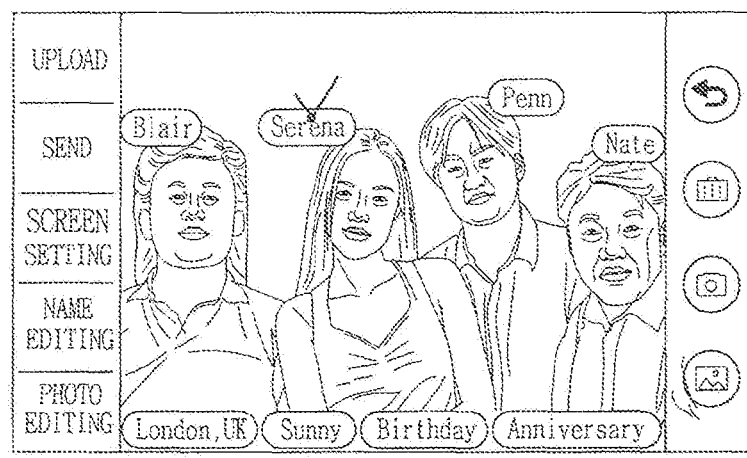
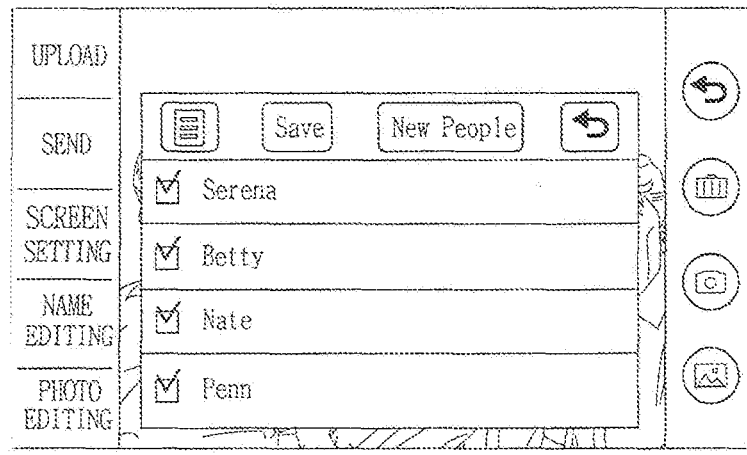

MOBILE TERMINAL AND TAG EDITING METHOD THEREOF

CROSS REFERENCE TO RELATED APPLICATIONS

The present application claims priority to Korean Application No. 10-2009-0094139 filed in Korea on Oct. 1, 2009, the entire contents of which is hereby incorporated by reference in its entirety.

BACKGROUND OF THE INVENTION

1. Field of the Invention

The present invention relates to a mobile terminal and a method for editing tag information of an image captured by a camera of the mobile terminal.

2. Description of the Related Art

As functions of terminals such as personal computers, notebook computers, mobile phones, and the like, become more diversified, the terminals, are generally implemented as multimedia players supporting complicated functions such as capturing images or video, reproducing music or video files, playing games, receiving broadcast signals, and the like.

In general, these terminals may be divided into mobile terminals and stationary terminals according to whether or not the terminals are movable during use. In addition, mobile terminals may be divided into handheld terminals and vehicle mount terminals according to whether the terminals are carried by a person during use.

Efforts are ongoing to support and increase the functionality of mobile terminals. Such efforts include software and hardware improvements, as well as changes and improvements in the structural components which form the terminals.

In general, in a mobile terminal, a captured image can be edited and a note (e.g., a message, a memo, or the like) can be inserted. However, regarding the related art mobile terminals, it is difficult to associate a tag with the captured image using the mobile terminal.

SUMMARY OF THE INVENTION

Accordingly, one object of the present invention is to address the above-noted problem and other problems.

Another object of the present invention is to provide a mobile terminal for editing tag information tagged to a captured image and a tag editing method of the mobile terminal.

Still another object of the present invention is to provide a mobile terminal for uploading a tagged captured image to a community site.

To achieve these and other advantages and in accordance with the purpose of the present invention, as embodied and broadly described herein, the present invention provides a tag editing method of a mobile terminal. The method includes operating a camera, displaying a preview image inputted via the camera on a preview screen, entering a tag editing mode from the preview screen, editing tag information in the tag editing mode, capturing an image by the camera after editing the tag information, tagging the edited tag information to the captured image to form a tagged image; and displaying the tagged image.

In another aspect, the present invention provides another tag editing method of a mobile terminal. This method tag editing includes operating a camera, capturing an image by the camera, tagging the captured image to form a tagged image, receiving a request for tag editing while the tagged image is displayed, entering a tag editing mode according to the request for tag editing, and editing a tag of the tagged image in the tag editing mode.

In still another aspect, the present invention provides a mobile terminal including a camera configured to acquire an image, a display unit configured to first display a preview image inputted via the camera on a preview screen, and a controller configured to edit tag information according to a tag editing request for the preview image on the preview screen, to capture the preview image displayed on the preview screen, to insert the edited tag information into the captured image to form a tagged image, and to display the tagged image on the display unit.

Further scope of applicability of the present invention will become apparent from the detailed description given hereinafter. However, it should be understood that the detailed description and specific examples, while indicating various embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 3 is a flow chart illustrating the process of a tag editing method of a mobile terminal according to an exemplary embodiment of the present invention;

FIGS. 13 and 14 illustrate entering a tag editing mode by a mobile terminal according to another exemplary embodiment of the present invention.

DETAILED DESCRIPTION OF THE INVENTION

Mobile terminals and methods of editing tag information of mobile terminals according to exemplary embodiments of the present invention will now be described with reference to the accompanying drawings. In the following description, usage of suffixes such as 'module', 'part' or 'unit' used for referring to elements is given merely to facilitate explanation of the present invention, without having any particular meaning by itself.

The mobile terminal described in the present invention may include mobile phones, smart phones, notebook computers, digital broadcast receivers, Personal Digital Assistants (PDAs), Portable Multimedia Players (PMPs), navigation devices, and the like. It should be understood by one of ordinary skill in the art that the features of the exemplary embodiments of the present invention can be also applicable to fixed types of terminals such as digital TVs, desk top computers, or the like, except for any elements especially configured for a mobile purpose.

Figure 1:
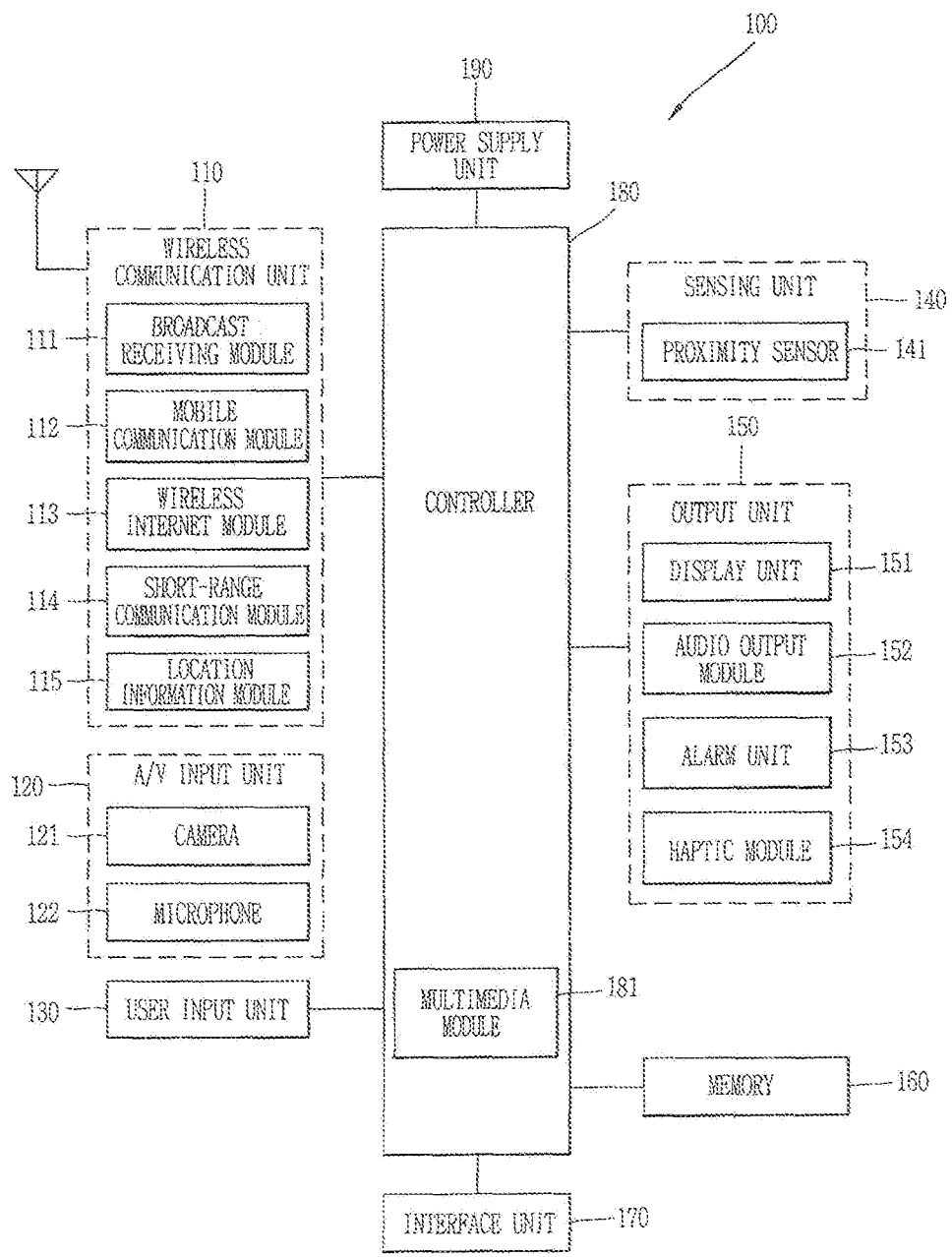
FIG. 1 is a schematic block diagram of a mobile terminal implementing an embodiment of the present invention.

FIG. 1 is a block diagram of a mobile terminal according to an embodiment of the present invention. As shown in FIG. 1, a mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal as having various components, but it should be understood that implementing all of the illustrated components is not a requirement. Greater or fewer components may alternatively be implemented.

The wireless communication unit 110 typically includes one or more components that allow radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an Electronic Program Guide (EPG) of Digital Multimedia Broadcasting (DMB), electronic service guide (ESG) of Digital Video Broadcast-Handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as Digital Multimedia Broadcasting-Terrestrial (DMB-T), Digital Multimedia Broadcasting-Satellite (DMB-S), Digital Video Broadcast-Handheld (DVB-H), the data broadcasting system known as Media Forward Link Only (MediaFLO®), Integrated Services Digital Broadcast-Terrestrial (ISDB-T), and the like. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, and the like), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a Wireless LAN (WLAN) (Wi-Fi), Wireless broadband (Wibro), World Interoperability for Microwave Access (Wimax), High Speed Downlink Packet Access (HSDPA), or the like.

The short-range communication module 114 is a module for supporting short range communications. Some examples of short-range communication technology include Bluetooth™, Radio Frequency Identification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone or the like in a phone call mode, a recording mode, a voice recognition mode, and the like, and can process such sounds into audio data. The processed audio (voice) data may be converted for output into a format transmittable to a mobile communication base station or other network entity via the mobile communication module 112 in case of the phone call mode. The microphone 122 may implement various types of noise canceling or suppression algorithms to cancel or suppress noise or interference generated in the course of receiving and transmitting audio signals.

The user input unit 130 or other user input device may generate input data from commands entered by a user to control various operations of the mobile terminal. The user input unit 130 may include a keypad, a dome switch, a touch pad (e.g., a touch sensitive member that detects changes in resistance, pressure, capacitance, or the like due to being contacted) a jog wheel, a jog switch, and the like.

The sensing unit 140 or other detection means detects a current status or state of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement, direction of the mobile terminal 100, and the like, and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, and the like). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication such as text messaging, multimedia file downloading, and the like. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent or light-transmissive to allow viewing through to the other side of the mobile terminal, which may be called transparent displays. A typical transparent display may be, for example, a Transparent Organic Light Emitting Diode (TOLED) display, or the like. Through such configuration, the user can view an object positioned at the rear side of the terminal body through the region occupied by the display unit 151 of the terminal body.

The mobile terminal 100 may include two or more display units or other display means according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, and the like). The audio output module 152 may include a speaker, a buzzer, or other sound generating device.

The alarm unit 153 or other type of user notification means may provide outputs to inform a user about the occurrence of an event of the mobile terminal 100. Typical events may include call reception, message reception, key signal inputs, a touch input, and the like In addition to audio or video outputs, the alarm unit 153 may provide outputs in a different manner to inform about the occurrence of an event. For example, the alarm unit 153 may provide an output in the form of vibrations or other tactile or sensible outputs. When a call, a message, or some other incoming communication is received, the alarm unit 153 may provide tactile outputs (e.g., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, and the like, an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, and the like) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with external devices connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority to use the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
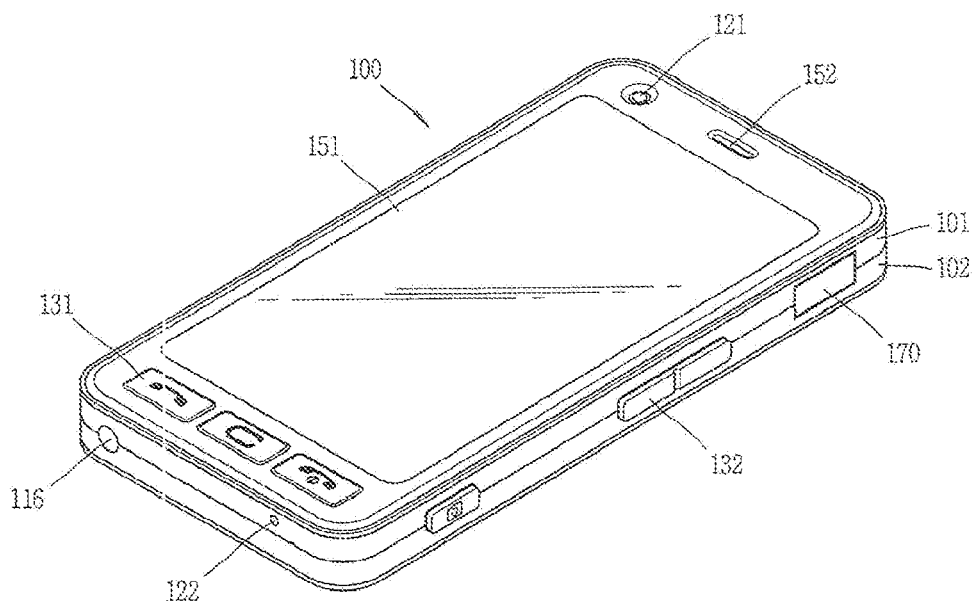
FIG. 2A is a front perspective view of a mobile terminal implementing an embodiment of the present invention.

FIG. 2A is a front perspective view of the mobile terminal according to an exemplary embodiment of the present invention.

The mobile terminal 100 includes a bar type terminal body 101. Without being limited thereto, the present invention can be also applicable to a slide type mobile terminal, a folder type mobile terminal, a swing type mobile terminal, a swivel type mobile terminal, and the like, including two or combination of types.

The terminal body includes a case (or casing, housing, cover, or the like) constituting the external appearance of the terminal body. In the present exemplary embodiment, the case may be divided into a front case 101 and a rear case 102. Various electronic components are installed in the space between the front case 101 and the rear case 102. One or more intermediate cases may additionally be disposed between the front case 101 and the rear case 102. The cases may be formed by injection-molding a synthetic resin or may be made of a metallic material such as stainless steel (STS) or titanium (Ti), and the like.

The display unit 151, the audio output module 152, camera 121, and the user input unit 130 (131, 132), the microphone 122, the interface 170, and the like, may be located on the terminal body, namely, mainly, on the front case 101.

The display unit 151 may occupy a major portion of the front surface of the front case 102. The audio output unit 151 and the camera 121 may be disposed at a region adjacent to one end of the display unit 151, and the user input unit 130 and the microphone 122 may be disposed at a region adjacent to another end of the display unit 151. The user input unit 132, the interface 170, and the like, may be disposed at the sides of the front case 101 and the rear case 102.

The user input unit 130 is manipulated to receive commands for controlling the operation of the mobile terminal 100, and may include a plurality of manipulation units 131 and 132. The manipulation units 131 and 132 may be generally called a manipulating portion, and they can employ any method so long as they can be manipulated in a tactile manner by the user.

Content inputted by the first and second manipulation units 131 and 132 may be variably set. For example, the first manipulation unit 131 receives commands such as start, end, scroll, or the like, and the second manipulation unit 132 may receive commands such as adjustment of size of a sound outputted from the audio output unit 152 or conversion to a touch recognition mode of the display unit 151.

Figure 2B:
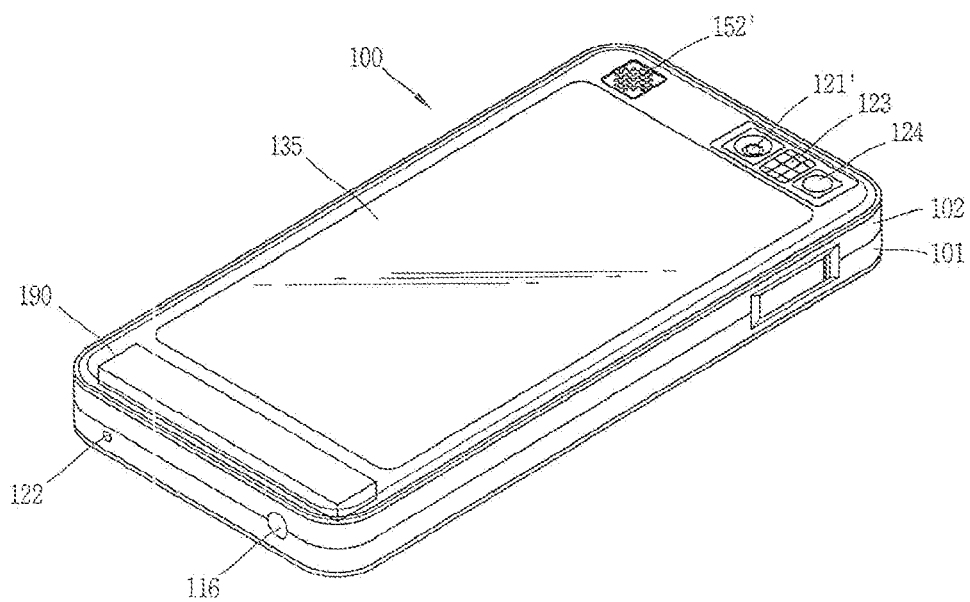
FIG. 2B is a rear perspective view of the mobile terminal of FIG. 2A.

FIG. 2B is a rear perspective view of the mobile terminal illustrated in FIG. 2A according to an exemplary embodiment of the present invention.

With reference to FIG. 2B, a camera 121' may additionally be disposed on a rear surface of the terminal body, namely, on the rear case 102. The camera 121' may have an image capture direction which is substantially opposite to that of the camera 121 (See FIG. 2A), and may support a different number of pixels (e.g., have a different resolution) than the camera 121.

For example, camera 121 may operate with a relatively lower resolution to capture an image(s) of the user's face and immediately transmit such image(s) to another party in real-time during video call communication or the like. Meanwhile the camera 121' may operate with a relatively higher resolution to capture images of general objects with high picture quality, which may not require immediately transmission in real time. The cameras 121 and 121' may be installed on the terminal such that they are rotated or popped up.

A flash 123 and a mirror 124, may additionally be disposed adjacent to the camera 121'. When an image of the subject is captured with the camera 121', the flash 123 illuminates the subject. The mirror 124 allows the user to see himself when he wants to capture his own image (self-image capturing) by using the camera 121' of the second body 205.

An audio output unit 152' may additionally be disposed on the rear surface of the terminal body. The audio output unit 152' may implement a stereoscopic function along with the audio output unit 152 (See FIG. 2A), and may be used for implementing a speaker phone mode during call communication.

A broadcast signal receiving antenna 116 may be disposed at the side of the terminal body in addition to an antenna that supports mobile communications. The antenna 116 forming a portion of the broadcast reception module 111 (in FIG. 1) may be installed to be extendable and retractable.

A power supply unit 190 for supplying power to the mobile terminal 100 may be mounted on the terminal body 101. The power supply unit 190 may be installed in the terminal body or may be directly detached from the outside of the terminal body.

A touch pad 135 for detecting a touch may additionally be mounted on the rear case 102. Such touch pad may be configured to be light-transmissive like the display unit 151. In this case, when the display unit 151 is configured to output visual information from both sides thereof, the visual information can be recognized through the touch pad 135. Information outputted to the both sides of the display unit 151 may all be controlled by the touch pad 135. Alternatively, a display may additionally be mounted on the touch pad 135, and a touch screen may be disposed on the rear case 102. The touch pad 135 is operated in relation to the display unit 151 of the front case 101. The touch pad 135 may be disposed to be parallel to the rear side of the display unit 151. The touch pad 135 may have the same size or smaller than the display unit 151.

FIG. 3 is a flow chart illustrating the process of a tag editing method of a mobile terminal according to an exemplary embodiment of the present invention. First, when a camera function is selected according to a menu manipulation of the user, the controller 180 operates the camera 121 (S101). The controller 180 displays a preview screen on a display screen (S102). In other words, the controller 180 displays an image input from the camera 121 on the display unit 151. In capturing an image, the controller 180 checks whether or not a tag function has been set while the preview screen is being displayed (S103). The tag function may be previously set through a menu manipulation by the user.

When the tag function has been set, the controller 180 collects tag information (S104). The tag information may include one or more of the name of a person in the image, a schedule and/or anniversary, a (current) location, weather conditions, and the like, related to the image.

If notification of the schedule and/or anniversary has been set, when the schedule and/or the anniversary arrives at the set date, the controller 180 outputs an image to which the schedule and/or the anniversary has been tagged, along with a notification signal. In this case, if there are two or more images to which the schedule and/or the anniversary has been tagged, the controller 180 may provide control to output all the images in the form of a slide show or to selectively output one of the images.

In this exemplary embodiment, the controller 180 compares face information of people in the preview screen with photo information registered in a phone book by using a face recognition technique to acquire the name of each person. In this case, when the face recognition of the people in the preview screen is completed, the controller 180 searches the memory 160 for a schedule and/or anniversary (a birthday, a wedding anniversary, a first date, and the like) previously registered in relation to the corresponding people.

Also, the controller 180 controls the location information module 115 to acquire location information of the current location of the terminal. The location information may include information such as a city name, a country name, and the like. Also, the controller 180 interworks with a weather condition widget to acquire current weather information. The controller 180 may acquire weather information from a site providing weather information such as a weather bureau site.

The controller 180 checks whether or not tag editing is requested from the preview screen (S105). In other words, the controller 180 maintains the preview screen until such time as a certain control command is inputted. When a tag menu is selected from menus displayed on the preview screen, the controller 180 recognizes it as a tag editing request command.

Upon receiving the tag editing request, the controller 180 enters a tag editing mode for tag editing (S106). In this case, the controller 180 discriminates the collected tag information according to the types of tags and displays a list of tags inputted to each tag field. When a tag field or item to be edited in the tag editing mode is selected, the controller 180 edits the corresponding field according to a user input (S107).

When the tag editing is completed, the controller 180 captures an image (S108 and S109). The controller 180 checks whether a command for storing the edited tag is inputted. When the storage command is inputted, the controller 180 stores the edited tag information and changes the tag editing mode to an image capture mode. When an image capture command is inputted from the user input unit 130 in the image capture mode, the controller 180 controls the camera 121 to acquire (capture) an image. Subsequently, the controller 180 the edited tagging information to the captured image (S110).

When the tagging is completed, the controller 180 stores the tagged image in the memory 160 (S111). In this exemplary embodiment, the controller 180 displays the tagged image on the display screen and, at the same time, stores the tagged image in the memory 160 or inquires the user as to whether to store it and stores the tagged image in the memory 160 according to a response to the inquiry. If the tag function is in a deactivated state in step S103, the controller 180 captures (acquires) the image through the camera 121 (S121). And then, the controller 180 stores the captured image in the memory 160 (S122). If there is no tag editing request in step S105, the controller 180 captures an image according to a control command inputted from the exterior (S109). And the controller 180 tags the collected tag information based on default information to the captured image and stores the same (S110 and S111).

In the exemplary embodiment as described above, the tag editing is performed on the preview screen before the capturing of the image, however, the tag editing operation may be performed after the image is captured.

FIGS. 4A to 4E show examples of performing tagging when a mobile terminal captures an image according to an exemplary embodiment of the present invention.

For example, when the user selects a camera menu through menu manipulation or manipulates a camera button, the controller 180 drives the camera 121. The camera 121 converts an analog image of an external object into digital data and transfers it to the controller 180. The controller 180 displays the image data received from the camera 121 as a preview screen on the display unit 151. The preview screen of the camera 121 displayed on the screen of the display unit 151 includes button icons with commands such as a tag 301 for a tag editing request, a setting mode 302, a flash regulation 303, a close-up capture setting/releasing 304, brightness adjustment 305, previous screen 306, image capture 307, a gallery (album) 308, and the like, assigned thereto. In this exemplary embodiment, the setting mode button is used to set functions related to image capturing such as an image capture size, a storage position, white balance, timer setting, filter, and the like.

When a touch applied to the tag icon 301 of the preview screen is sensed, the controller 180 recognizes the touch input as a tag editing request and changes the image capture mode to the tag editing mode. And then the controller 180 displays a pop-up window displaying a tag list, as shown in FIG. 4B, on the preview screen.

The user may select information to be tagged to the previewed image by touching a check box positioned at one portion of the tag field of the tag list. When the selected check box is touched again, the selection may be released. When the check boxes of a position tag, a weather condition tag, a name tag are released, the controller 180 displays 'No tag'. Also, when the check box of an event tag is released, the controller displays 'No event'.

When tag selection is completed and a touch applied to a certain tag field of the tag list is detected, the controller changes from the pop-up window displaying the tag list to an editing window allowing for tag information editing. For example, when the name tag field is selected from the tag list, the controller displays an editing window allowing for editing of name tag information, as shown IN FIG. 4C. The controller 180 outputs to the display unit 151 an editing window displaying the name of people on the preview screen recognized through face recognition. The user may change the name of the people or releases the selection on the pop-up window.

Figure 4A:
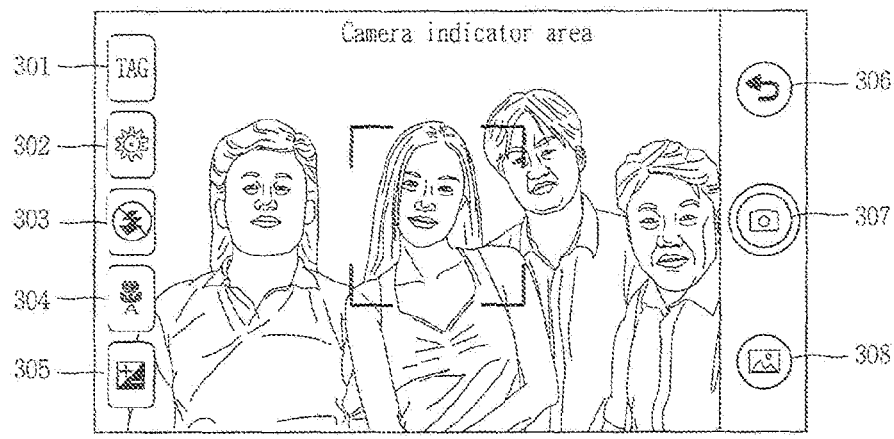
FIGS. 4A to 4E show examples of performing tagging when a mobile terminal captures an image according to an exemplary embodiment of the present invention.
Figure 4B:
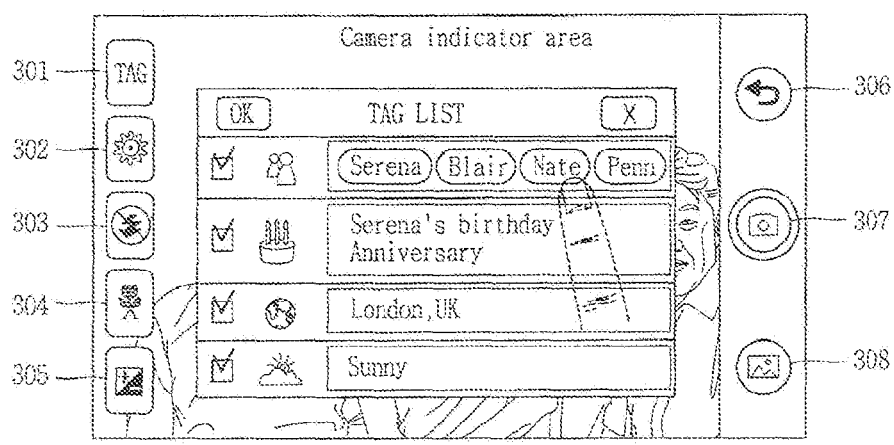
Figure 4C:
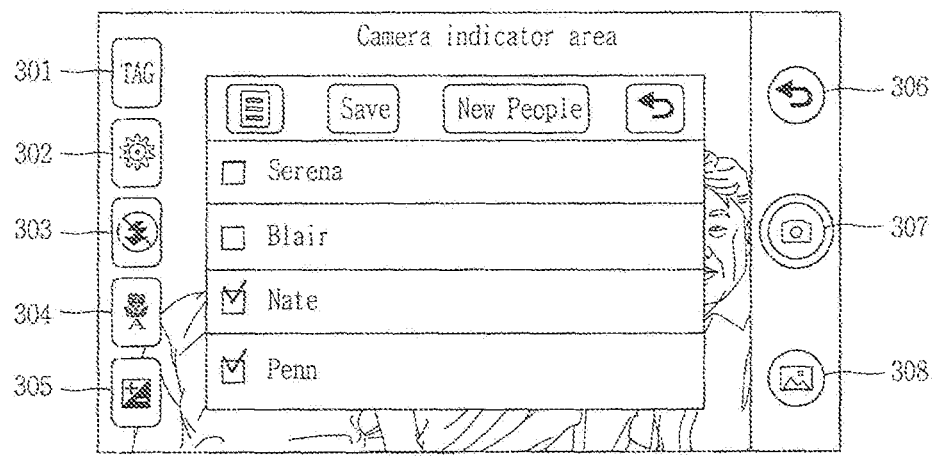

When a storage icon is inputted after the tag editing is completed, the controller 180 displays the pop-up window displaying the tag list, as shown in FIG. 4B. When tag information to be inserted as a tag is selected from the tag list pop-up window and an 'OK' or other enter icon is touched, the controller 180 stores the edited tag information in the memory 160.

Figure 4D:
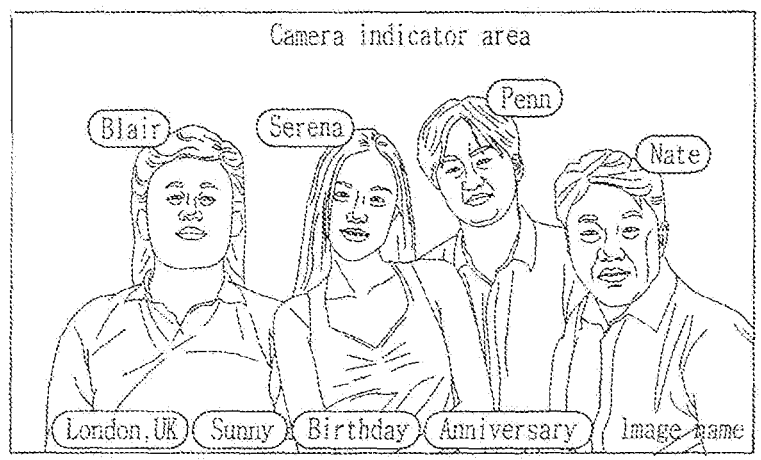

When an image capture command is inputted from the user input unit 130 after the tag editing is completed, the controller captures an image through the camera 121. The controller 180 inserts the selected tag as an icon or text to the captured image and displays the same on the display screen, as shown in FIG. 4D. When the image capturing is completed, the controller 180 deletes the person information list which has been displayed on the name tag editing window. Namely, there is no tag information in the name tag field any longer.

Meanwhile, if an 'X' icon or other cancel icon is selected from the tag list pop-up window, the controller 180 returns it to the originally set value, without reflecting a changed matter, and then terminates the tag editing mode. Namely, when a touch applied to the 'X' icon (e.g., a cancel icon) is detected, the mobile terminal 100 returns to the state before the tag editing and terminates the tag editing mode.

Figure 4E:
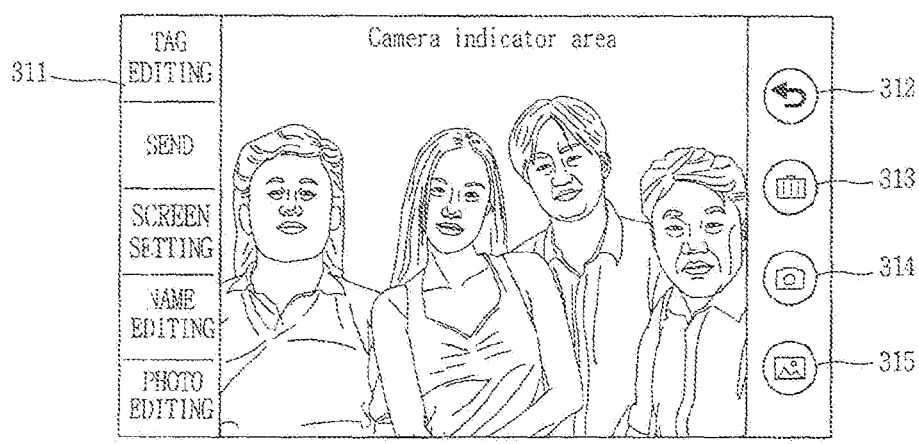

When a proximity touch or a touch is inputted to the display screen displaying an image capture checking screen (e.g., a screen after capturing an image) for checking an image captured by the camera 121, as shown in FIG. 4D, the controller 180 displays a menu bar 311 and function icons 312 to 315 as shown in FIG. 4E. The menu bar 311 includes one or more menus using the captured image such as tag editing, send (multimedia transmission, BLUETOOTH transmission, SNS site transmission, and the like), a screen setting (a background image, a call reception image, a call origination image, a screen when power is turned on, a screen when power is turned off, and the like) name editing for editing an image data file name, photo editing for editing an image. Also, the function icons include icons with commands such as a previous image 312, deletion 313, confirmation 314, gallery 315, and the like, assigned thereto. This allows for further editing of a previously captured image regardless of whether the image has been tagged/

Figure 5:
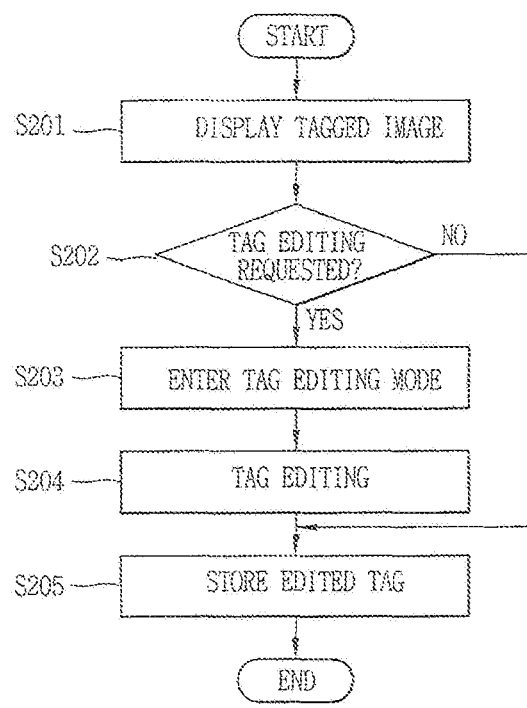
FIG. 5 is a flow chart illustrating the process of a tag editing method of a mobile terminal according to another exemplary embodiment of the present invention.

FIG. 5 is a flow chart illustrating the process of a tag editing method of a mobile terminal according to an exemplary embodiment of the present invention. With reference to FIG. 5, the controller 180 accesses image data tagged from the memory 160 according to a user input, and displays the same on the display unit 151 (S201). For example, when the user selects the album function through menu manipulation, the controller 180 arranges and displays the image data stored in the memory 160. When one of the displayed image data is selected, the controller 180 displays the selected image data on the entire display screen. Alternatively, after an image is captured, the controller 180 tags the captured image according to pre-set information, and displays the tagged image data on the display screen.

While the tagged image data is being displayed on the display screen, the controller 180 checks whether or not there is a tag editing request (S202). Namely, when a touch or a proximity touch applied to the display screen displaying the image data by the user is detected, the controller 180 displays menu icons. When a touch applied to the tag editing menu among the menu icons is detected, the controller 180 recognizes it as a tag editing request. Alternatively, when the tag editing function is selected through a menu button manipulation of the user input unit 130, the controller 180 recognizes it as a tag editing request.

Upon receiving the tag editing request, the controller 180 enters the tag editing mode allowing for tag editing (S203). At this time, the controller 180 changes the image data displayed on the display screen into a tag editing screen. The tag editing screen displays a list of tags tagged to the image. Thereafter, the controller 180 selects a particular tag item from the tag list displayed on the tag editing screen according to a user input, and edits the selected tag item (S204).

When the tag editing is completed, the controller 180 reflects the changed tag information on the corresponding image data and stores the same (S205). In this case, the controller 180 displays the image data reflecting the changed tag information on the display screen.

Figure 6A:
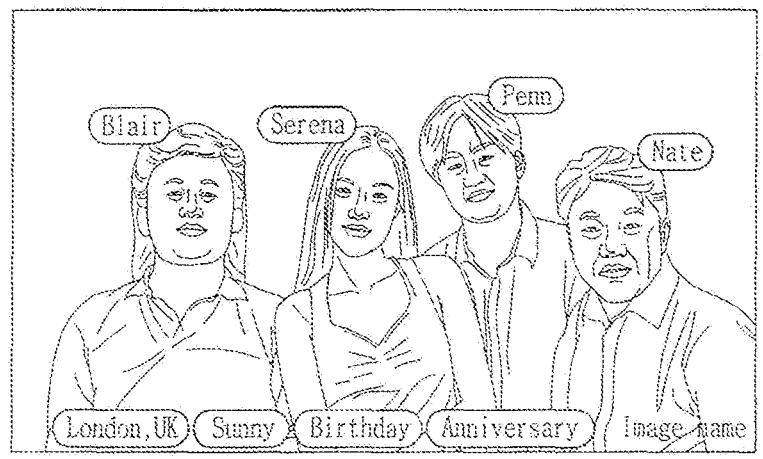
FIGS. 6A to 6E illustrate editing of name tags by a mobile terminal according to another exemplary embodiment of the present invention.

The operation of editing each tag in the mobile terminal according to an exemplary embodiment of the present invention will now be described with reference to FIGS. 6A to 6E. Namely, editing of name tags is described. First, the controller 180 of the mobile terminal 100 displays a tagged image (photo) data on the display unit 151, as shown in FIG. 6A. The controller 180 reads the image data from the memory 160 and displays it or tags the image data acquired through the camera 121 and displays it as a captured image check screen.

Figure 6B:
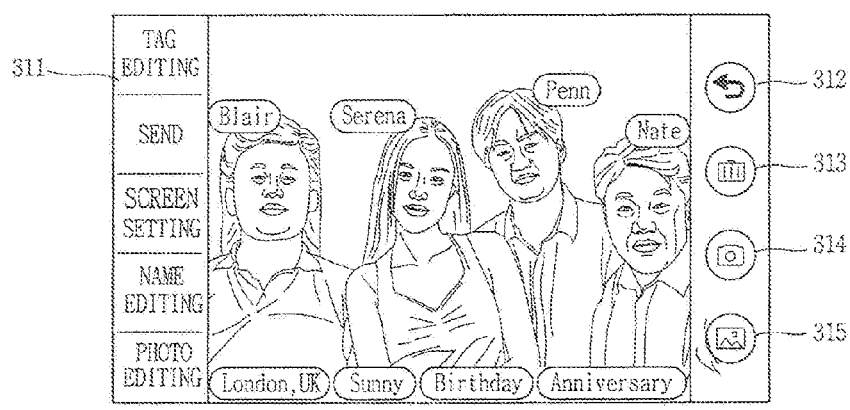

When a touch applied to the display screen displaying the tagged image data is detected, the controller 180 displays the menu icons, as shown in FIG. 6B. The controller 180 may display the menu icons such that they overlap with the image data, or may allocate a region for displaying the menu icons at a side portion of the display screen and display the menu icons on the allocated region. In this exemplary embodiment, the controller 180 reduces the region for displaying the image data to account for the region allocated to the menu icon display region. The image data can be reduced to fit in the reduced display region.

Figure 6C:
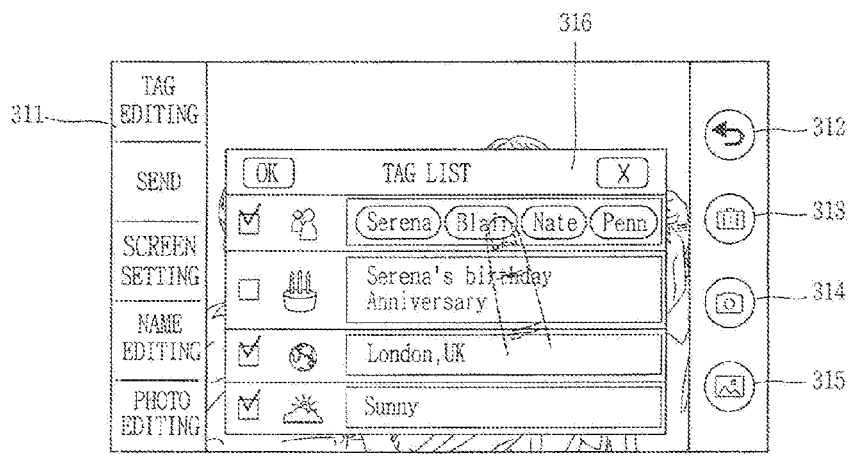

When the 'tag editing' menu among the displayed menus is selected by touching the tag editing input 311, the controller 180 displays a tag list 316, as shown in FIG. 6C. The tag list 316 includes types of tags that can be tagged and corresponding tag information. The types of tags may include a name of a person, an event, a location, a weather condition, memo, and the like. The name tag includes tag information such as the name, e.g., information regarding a person in the image. The event tag includes tag information such as a schedule, an anniversary, a birthday, an appointment, and the like, related to the person in the image. The location tag refers to information regarding a location where an image is captured, such as a city name, a country name, and the like. The weather condition tag includes weather information acquired when the image is captured.

Figure 6D:
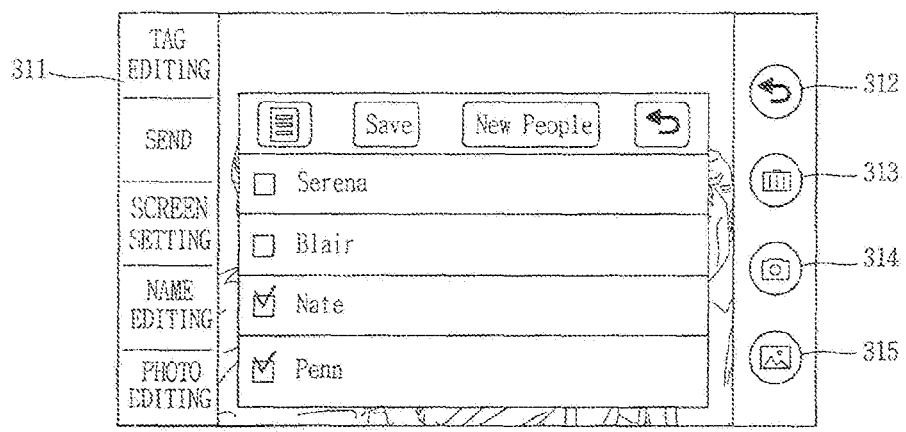

When a desired item (tag field) is selected from the tag list, the controller 180 displays an editing window allowing for editing of the corresponding item, as shown in FIG. 6D. The editing window includes the name or names of peopled recognized by a face recognition function of the mobile terminal. Individuals desired to be tagged among the people are selected by touching check boxes positioned at one side of the individual. Whenever the check boxes are touched, the controller 180 alternately repeats selection and releasing.

For example, the controller 180 displays 'Serena', 'Blair', 'Penn', and 'Nate', as the names of the people in the photo tagged through face recognition. The user selects the names of people to be inserted as tags from among the displayed names. Namely, the corresponding names are selected or released when the check boxes corresponding to the respective names are touched. As shown in FIG. 6D, the selection of the check boxes of 'Serena' and 'Blair' is released and the check boxes of 'Nate' and 'Penn' are touched to be selected.

Figure 6E:
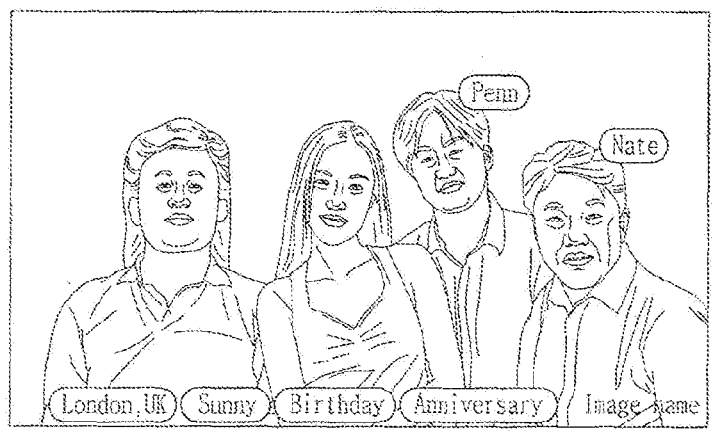

Thereafter, when a storage command is inputted, the controller 180 displays image data reflecting the changed tag information on the display screen. For example, as shown in FIG. 6E, the controller 180 inserts the selected 'Nate' and 'Penn' as tags into the image data and excludes 'Serena' and 'Blair' which have been released from the selected state, from the tag of the corresponding image data.

Figure 7A:
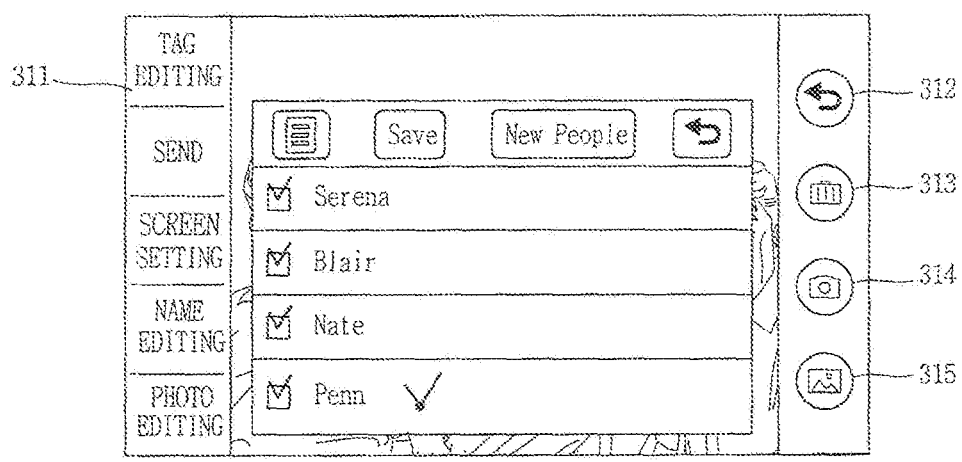
FIGS. 7A to 7E illustrate directly editing name tags by a mobile terminal according to another exemplary embodiment of the present invention.

FIGS. 7A to 7E illustrate directly editing name tags by a mobile terminal according to an exemplary embodiment of the present invention. As described above, when tag editing is requested by the user while the tagged image data is being displayed, the controller 180 enters the tag editing mode. When the name field is selected from among one or more tag fields in the tag editing mode, the controller 180 displays the list of names of the people in the photo image on the display unit 151, as shown in FIG. 7A. The controller 180 arranges and displays the names of the people recognized through face recognition of the people on the photo or arranges and displays previously tagged names.

Figure 7B:
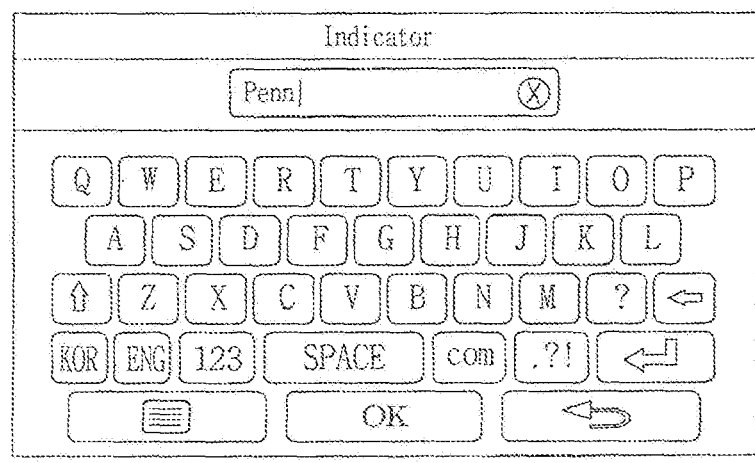

When one of the names of the displayed people is selected, the controller 180 outputs to the display unit 151 an editing screen for changing the selected name. The name editing screen includes a text input window displaying inputted data and a keypad icon for inputting the data. For example, when 'Penn' is selected from the list of name of people, as shown in FIG. 7A, the controller 180 inputs the selected name 'Penn' to the text input window, as shown in FIG. 7B, and shifts and displays a cursor to the end of the name.

Figure 7C:
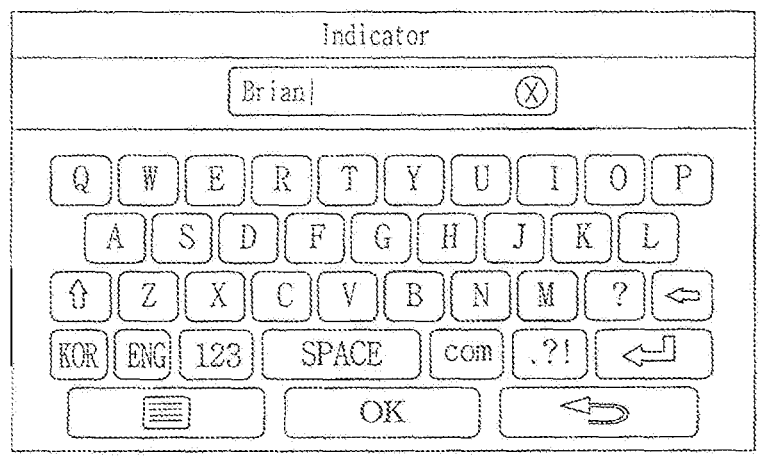

After deleting the entirety or a portion of the name displayed on text input window, the user directly inputs the name of the person. When a touch applied to a point on the keypad icon is detected, the sensing unit 140 transmits location information of the corresponding point to the controller 180. The controller 180 inserts data corresponding to the location information into the text input window. For example, the name which has been inputted into the text input window shown in FIG. 7B is deleted, and the mobile terminal 100 inputs a new name 'Brian' to the text input window according to a user input. Thereafter, when editing of the name of the selected person is completed, the controller 180 changes the selected name into the newly inputted name. For example, the controller 180 changes 'Penn' into 'Brian', as shown in FIG. 7C.

Figure 7D:
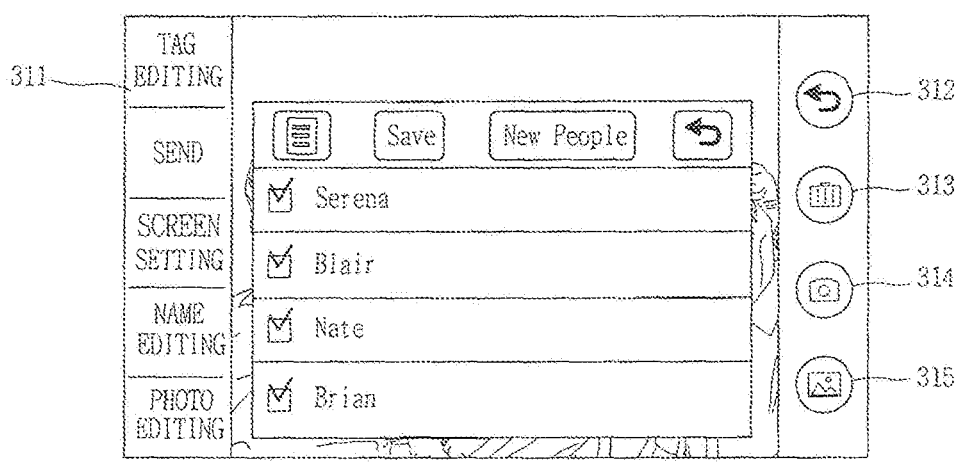
Figure 7E:
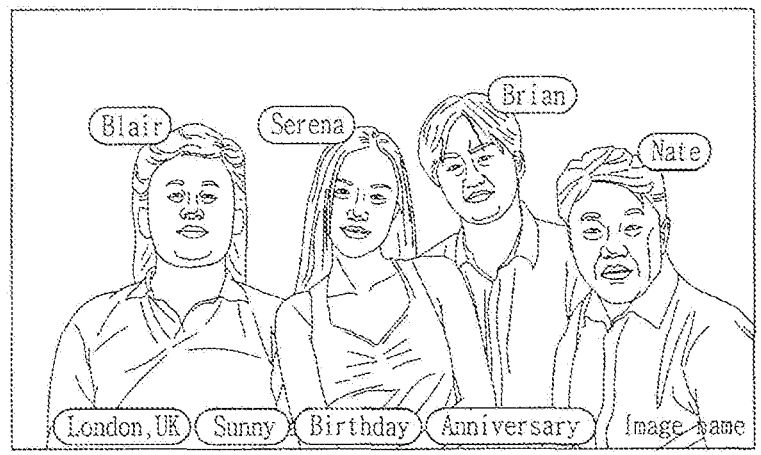

One or more names can be selected to be displayed, as shown in FIG. 7D. Subsequently, when a storage command is inputted, the controller 180 displays the edited tag information, as shown in FIG. 7E.

FIGS. 8A to 8E illustrate editing name information by using a phone book function of a mobile terminal according to an exemplary embodiment of the present invention.

Figure 8A:
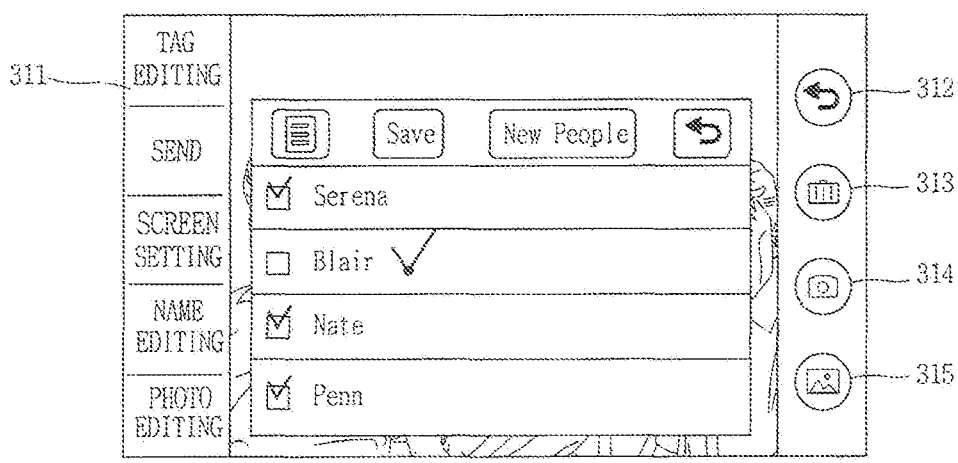
FIGS. 8A to 8E illustrate editing name tags by using a phone book function of a mobile terminal according to another exemplary embodiment of the present invention.
Figure 8B:
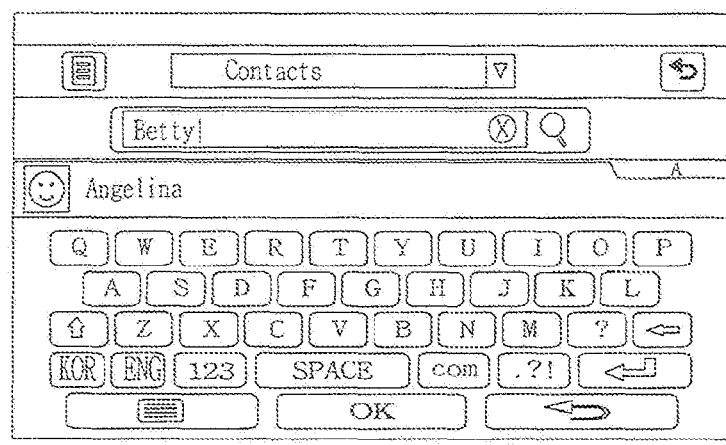

With reference to FIG. 8A, when name information tag editing is requested while the mobile terminal 100 is displaying the tagged image data, the controller 180 displays the names of the people inputted as tagging information. When one of the names of the displayed people is selected, the controller 180 executes a phone book function. After executing the phone book function, the controller 180 inputs a search word 'Betty' inputted through the keypad icon to a search word window of the phone book function, as shown in FIG. 8B.

Figure 8C:
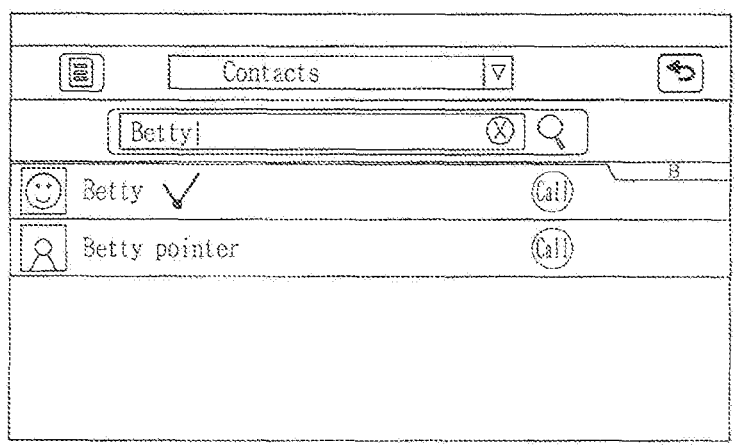

When a search command is inputted after the search word is inputted, the controller 180 searches contact information (e.g., counterparts desired to be contacted) including the inputted search word from the phone book. The controller 180 then displays a list of searched contact people, as shown in FIG. 8C.

Figure 8D:
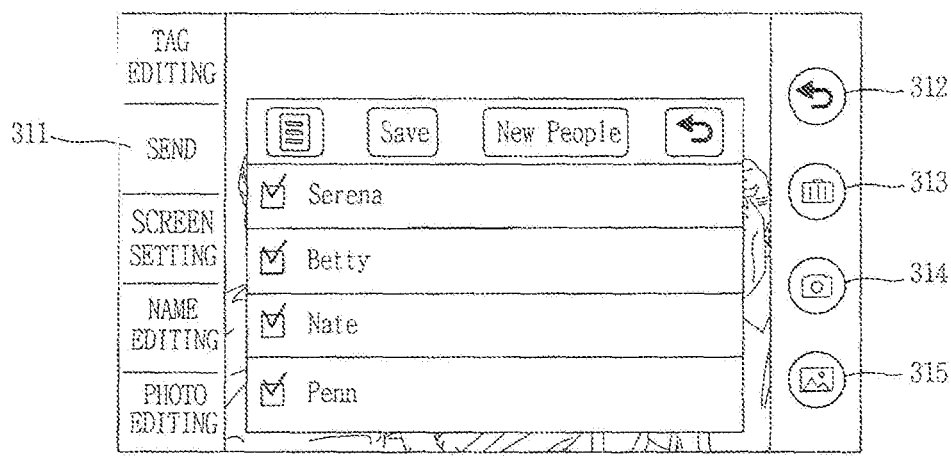
Figure 8E:
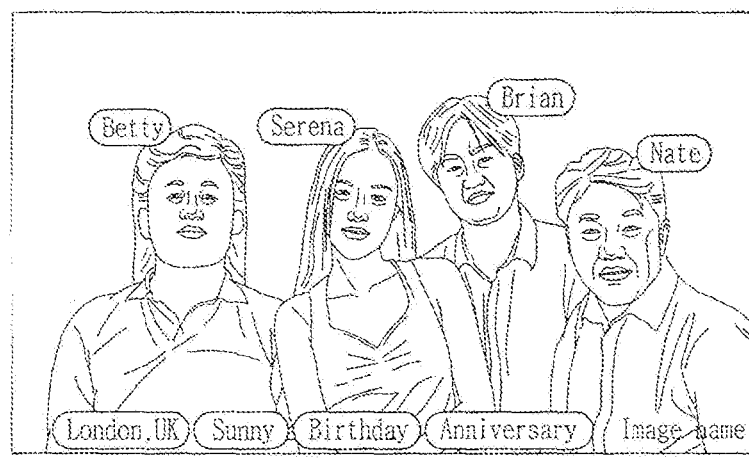

When one of the searched contact people is selected, the controller 180 changes the name of the person in the name tag to the name of the selected contact person, as shown in FIG. 8D. Namely, the tag information 'Blair' before the name tag editing into the selected contact person 'Betty'. When the name information editing is completed, the edited tag information is reflected on the corresponding photo and then displayed on the display screen, as shown in FIG. 8E.

Figure 9A:
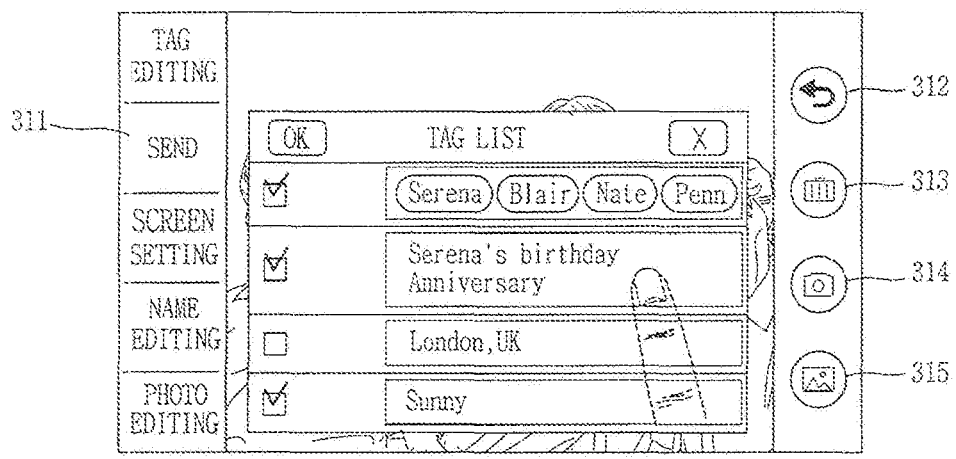
FIGS. 9A to 9D illustrate one manner of editing an event tag by a mobile terminal according to another exemplary embodiment of the present invention.

While the foregoing description focused on changing name tag information, the above processes can be used to change other tags associated with an image. FIGS. 9A to 9D illustrate one example of editing an event tag by a mobile terminal according to an exemplary embodiment of the present invention. With reference to FIG. 9A, when tag editing is requested while tagged image data is displayed, the controller 180 of the mobile terminal 100 enters the tag editing mode. Also, the controller 180 displays a tag list on the display screen, while entering the tag editing mode.

Figure 9B:

When an event tag field is selected from the tag list, the controller 180 displays an event tag editing screen, as shown in FIG. 9B. The event tag editing screen shows a list of events registered (recorded) as current events. Each item included in the event list may be a schedule and/or an anniversary registered in a scheduler of the mobile terminal 100 or a schedule and/or an anniversary which has been downloaded from a social network service (SNS) site. If one exists, the controller 180 displays an icon 320 representing the SNS site that provides the corresponding event at one side of the event item provided form the SNS site on the event list. When the icon 320 is selected, the corresponding SNS site can be accessed.

Figure 9C:
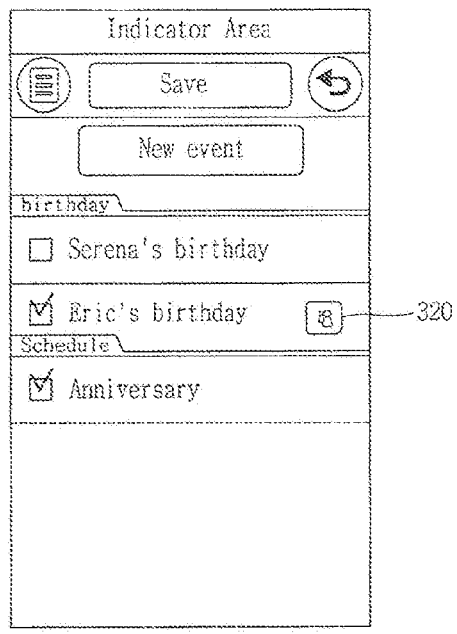
Figure 9D:
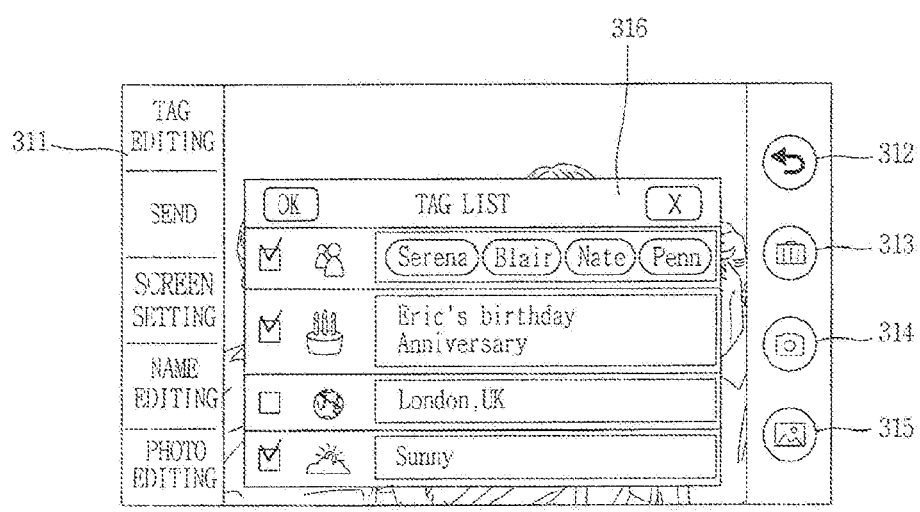

The controller 180 releases a selection of an event item to be excluded in the tag from the event list displayed according to a user instruction. For example, when a check box corresponding to an event item 'Serena's birthday' to be excluded from the event list displayed on the display screen is touched, as shown in FIG. 9A, the controller 180 releases the selection of the corresponding event item, as shown in FIG. 9C. Thereafter, when a storage icon located at an upper end of the screen is touched, the controller 180 recognizes the corresponding touch input as a storage command and excludes the selected event item from the event tag, as shown in FIG. 9D, thereby showing 'Eric's birthday'.

FIGS. 10A to 10F illustrate another example of editing an event tag by a mobile terminal according to an exemplary embodiment of the present invention. In this exemplary embodiment, a situation where a new event is registered will be taken as an example.

Figure 10A:
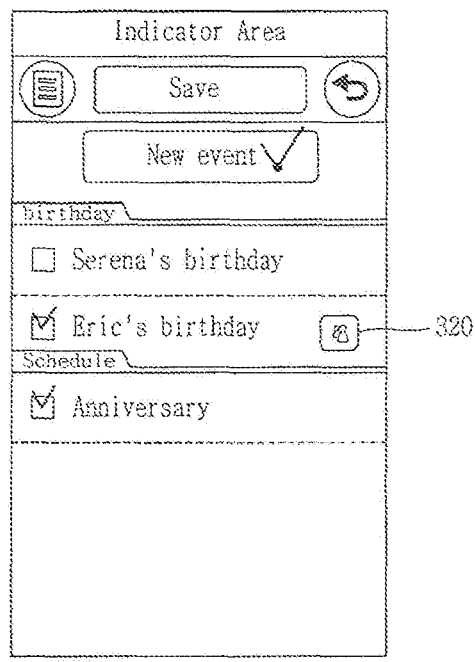
FIGS. 10A to 10F illustrate another manner of editing an event tag by a mobile terminal according to another exemplary embodiment of the present invention.
Figure 10B:
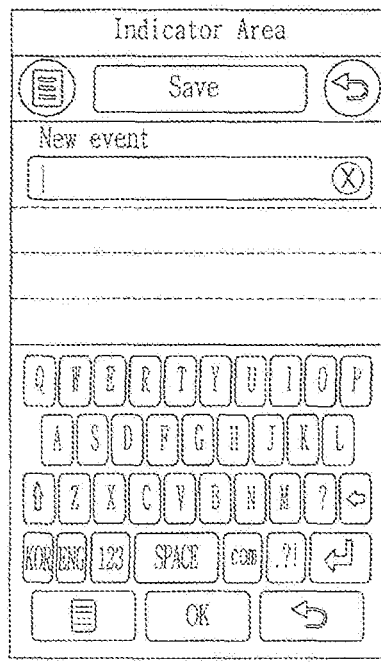

When event tag editing of image data is requested, the controller 180 displays an event tag editing screen, as shown in FIG. 10A. When a new event icon is selected from the event tag editing screen, the controller 180 displays an event creation screen, as shown in FIG. 10B. The event creation screen includes a keypad icon for an event input and a text input window displaying data inputted by the keypad icon.

Figure 10C:
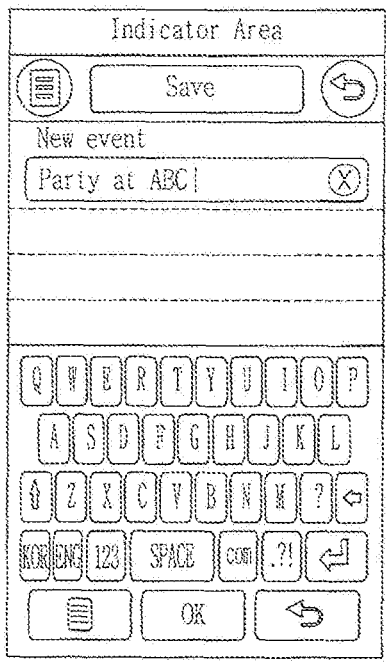

When the user inputs a new event by using the keypad icon on the event creation screen, the controller 180 inputs data inputted by the user to the text input window. For example, the controller 180 of the terminal inputs a new event 'Party at ABC' inputted according to manipulation of the keypad icon to the text input window, as shown in FIG. 10C, on the event creation screen. When the creating of the new event is completed, the controller 180 adds the inputted new event to the event list. In this case, the controller 180 may register the added new event to the scheduler.

Figure 10D:
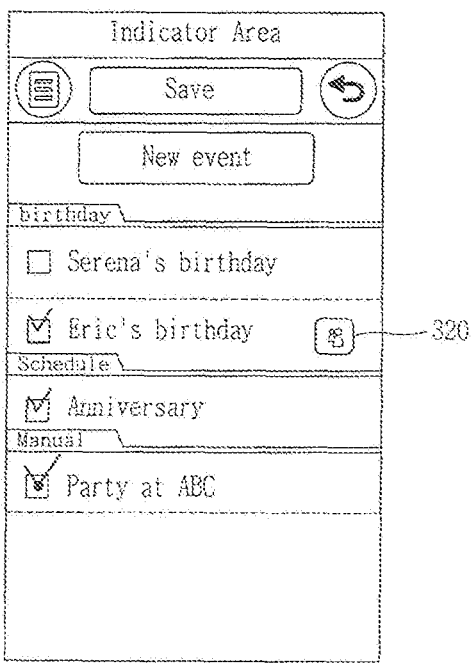
Figure 10E:
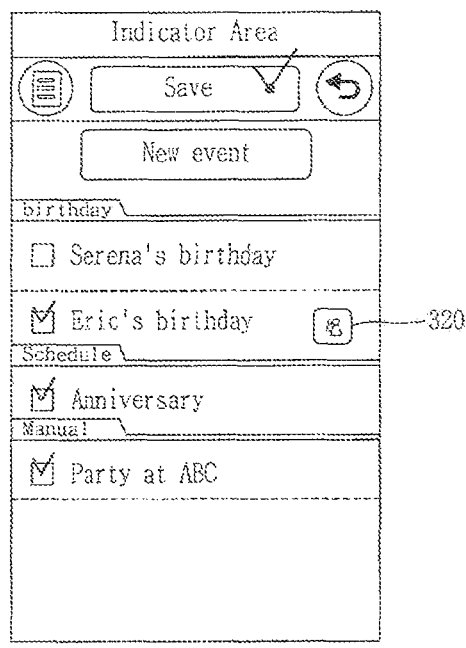
Figure 10F:
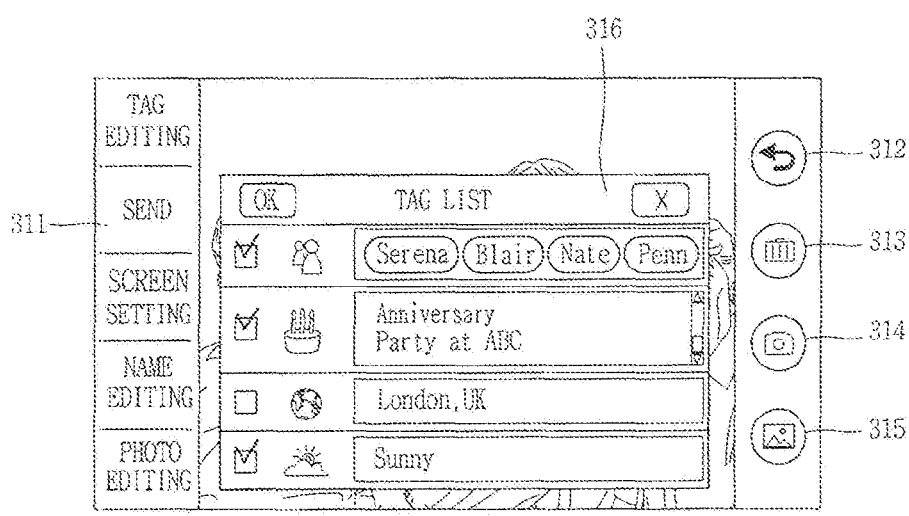

After adding the new event to the event list, the user may determine whether to input the added new event as tag information by selecting or releasing a check box corresponding to the event, as shown in FIGS. 10D and 10E. For example, when the check box of the new event is selected and a storage command is then inputted, the controller 180 adds the new event to the event tag as shown in FIG. 10F.

Figure 11A:
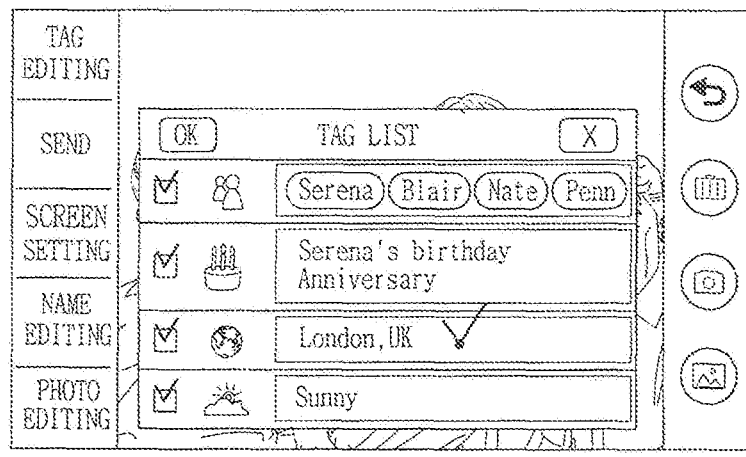
FIGS. 11A to 11C illustrate editing of a location tag by a mobile terminal according to another exemplary embodiment of the present invention.
Figure 11B:
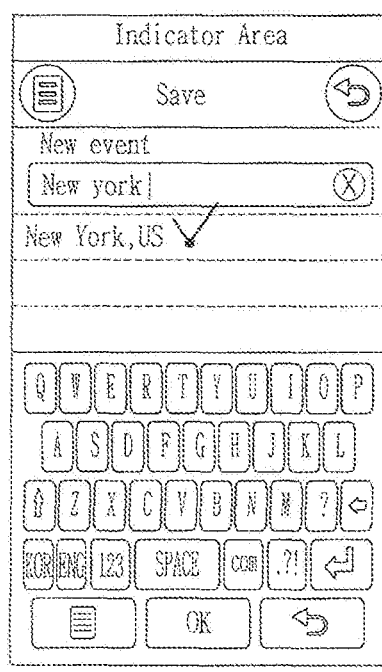
Figure 11C:
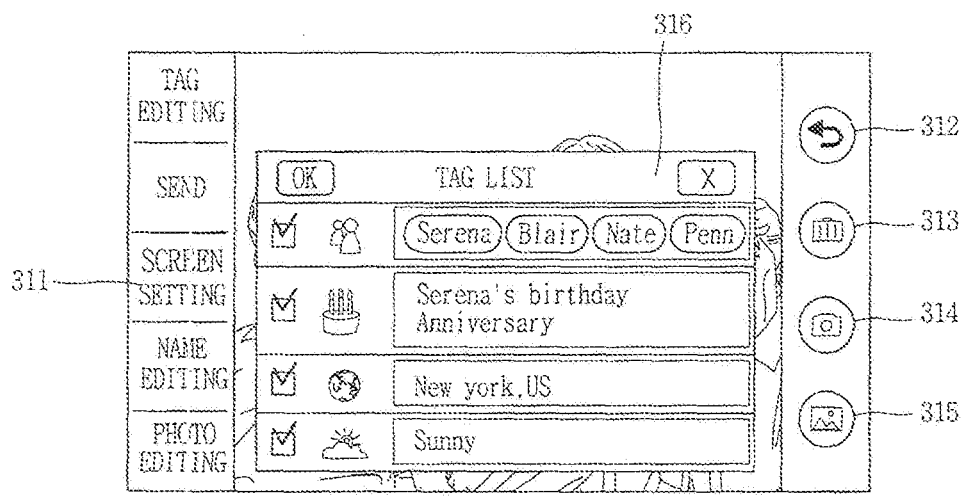

FIGS. 11A to 11C illustrate editing of a location tag by a mobile terminal according to an exemplary embodiment of the present invention. As shown in FIG. 11A, when a touch applied to the location tag field (item) on the tag editing screen is detected, the controller 180 recognizes it as a location tag editing request. According to the request, the controller 180 executes the location search function. The controller 180 may display a world map in a spread form or in a globe form. Alternatively, the controller 180 may display a location search screen on the display unit 151, as shown in FIG. 11B.

A search word such as a city name or a country name may be inputted to a search word window on the displayed location search screen. For example, as shown in FIG. 11B, when 'New York' is inputted as a search word, the controller 180 searches a country and/or a city including the inputted search word and displays search results.

When one item is selected from among the displayed search results, the controller 180 reflects the selected item as a location tag. For example, as shown in FIG. 11C, when 'New York, US' is selected from among the search results, the controller 180 changes the location tag from a previously location tag 'London, UK' into the selected location tag 'New York, US'.

Figure 12A:
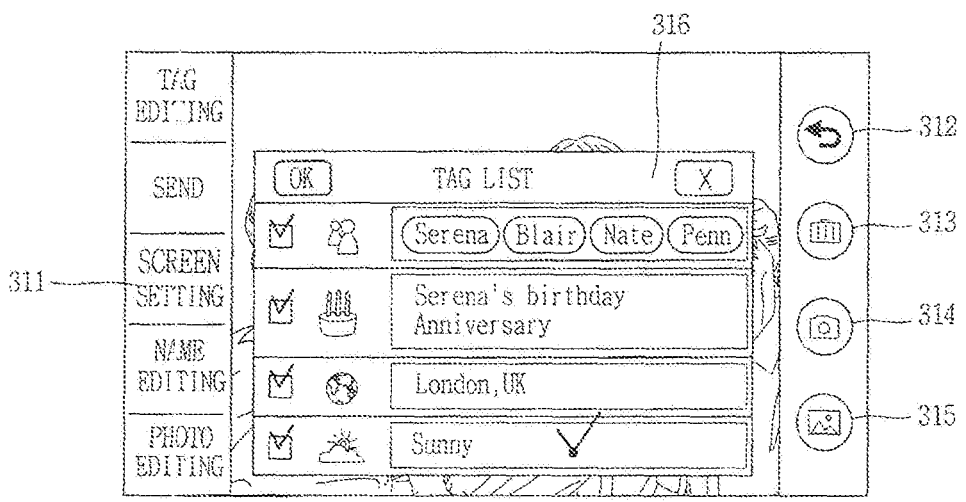
FIGS. 12A to 12C illustrate editing of a weather condition tag by a mobile terminal according to another exemplary embodiment of the present invention.
Figure 12B:
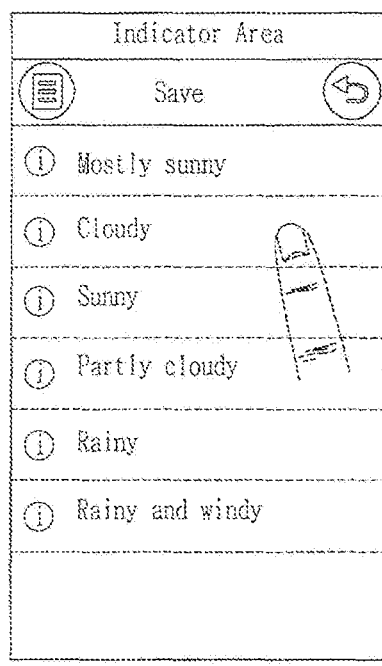
Figure 12C:

FIGS. 12A to 12C illustrate editing of a weather condition tag by a mobile terminal according to an exemplary embodiment of the present invention. As shown in FIG. 12A, when a touch applied to the weather condition tag field is detected in the tag editing mode, the controller 180 recognizes it as a weather condition tag editing request and changes the current mode to the weather condition editing mode.

The controller 180 displays a screen including types of weather conditions arranged, as shown in FIG. 12B. When a touch applied to one item among the displayed types of weather conditions is detected, the controller 180 reflects the corresponding item as a weather condition tag. For example, if 'Cloudy' is selected from among the types of weather conditions displayed on the display screen, the controller 180 changes previous weather condition tag information 'Sunny' into the selected weather condition tag information 'Cloudy'.

Figure 14:
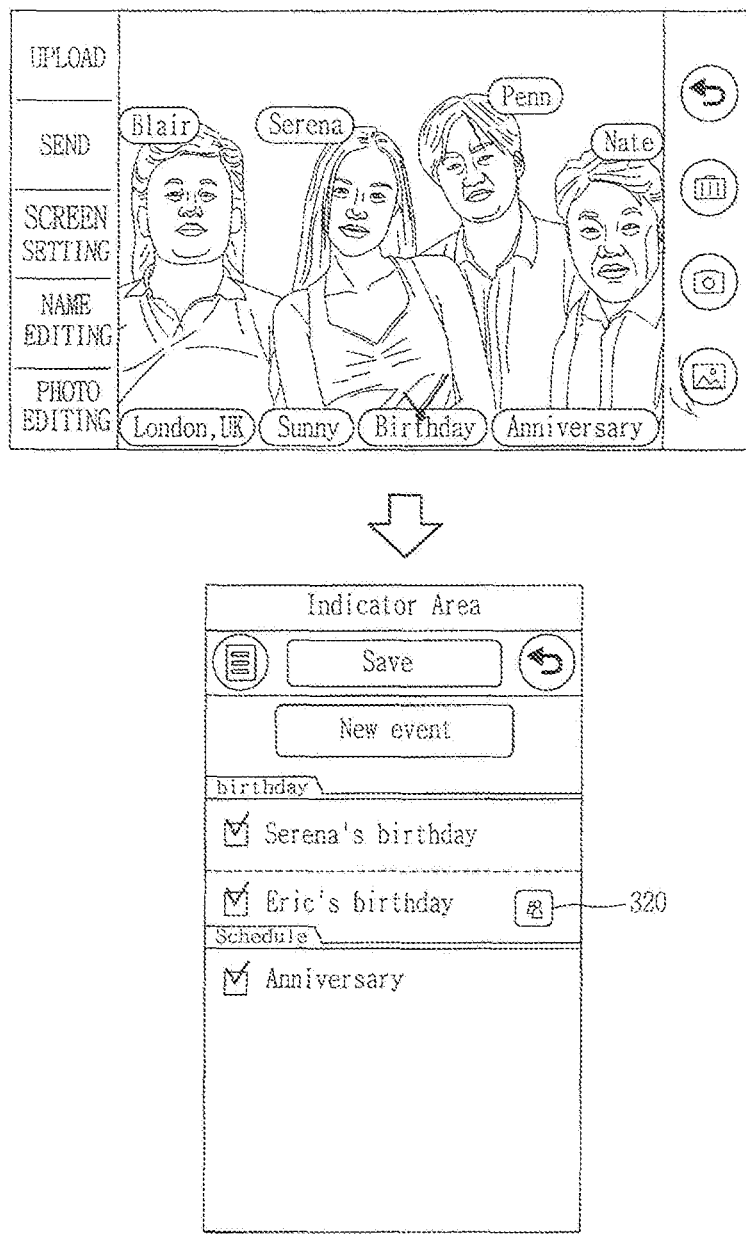

FIGS. 13 and 14 illustrate entering a tag editing mode by a mobile terminal according to an exemplary embodiment of the present invention. With reference to FIG. 13, the controller 180 of the mobile terminal 100 outputs tagged image data selected by the user from among the image data stored in the memory 160 to the display unit 151. If there is no user input with respect to menu bars and icons to which particular commands have been assigned, the controller 180 causes the icons to disappear from the display screen (concealment). When one of the tags displayed on the image data is selected, the controller 180 enters a corresponding tag editing mode.

For example, if the name of a person 'Serena' is selected from among the tag tagged to image data, the controller 180 changes the current screen into the person tag editing screen. Namely, the controller 180 displays the person information list tagged to the image data in a pop-up manner on the display screen.

With reference to FIG. 14, when a 'Birthday' tag is selected from the tags of the image data while the tagged image data is being displayed, the controller 180 enters the event editing mode. Namely, the controller 180 displays a list of events that can be registered as tags. Here, the controller checks the check boxes corresponding to the event items registered as tags on the current image among the displayed list of events.

Figure 15A:
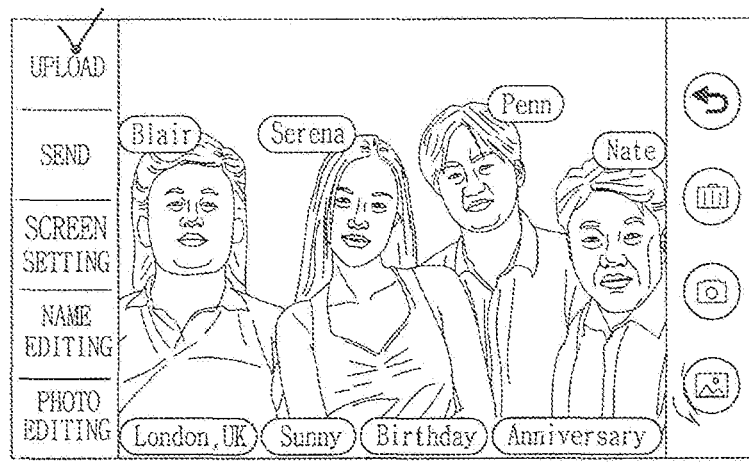
FIGS. 15A to 15C illustrate uploading tagged image data to an SNS site by a mobile terminal according to another exemplary embodiment of the present invention.
Figure 15B:
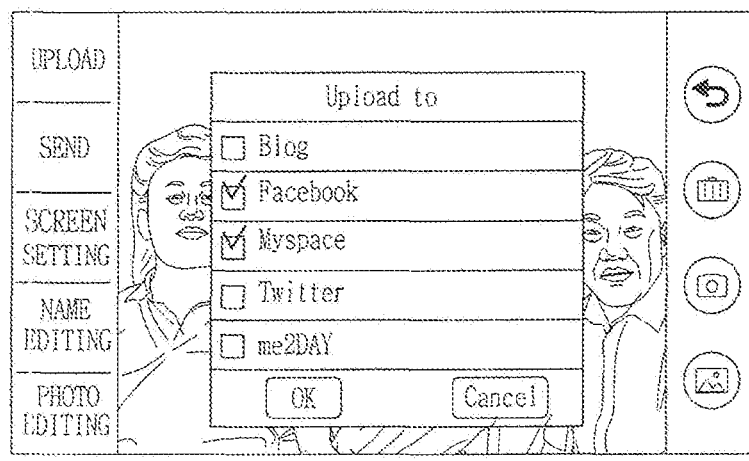
Figure 15C:
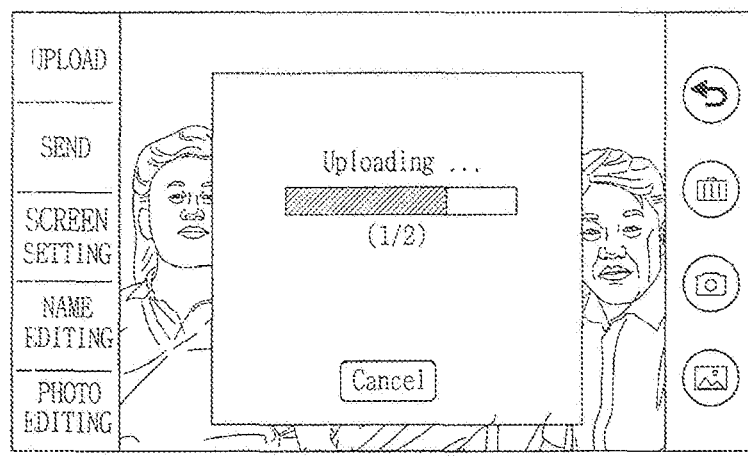

FIGS. 15A to 15C illustrate uploading tagged image data to an SNS site by a mobile terminal according to an exemplary embodiment of the present invention. First, the controller 180 displays tagged image data on the display screen according to a user instruction. When a proximity touch applied to the display screen is detected, the controller 180 displays particular menus or function-assigned icons on the image data in an overlap manner, as shown in FIG. 15A.

When uploading of the displayed menus is selected, the controller 180 displays a list of sites that can be uploaded, as shown in FIG. 15B. When one or more sites are selected from the displayed site list, the controller 180 uploads the corresponding image data to the selected sites. The controller 180 separates tag information from the image data and generates content to be posted to a message board by using the separated tag information. For example, the controller 180 attaches the image data, excluding the tagged information, as an attachment file of a multimedia message, generates content of the multimedia message by using the tag information of the tagged image data, and transmits it to the corresponding sites.

The controller 180 displays a transmission state of the multimedia message generated by the tagged image data, as a state bar, as shown in FIG. 15C. The controller 180 may perform multitasking according to an external input. For example, the controller 180 transmits the tagged image data to the SNS site and, at the same time, plays music by controlling the multimedia module 181. After uploading the tagged image data to the SNS site, if the tag information of the corresponding image data is changed, the controller 180 may reflect the changed information to the SNS site.

In the present exemplary embodiment, where the tagged image data is uploaded to the SNS site according to the user input is taken as an example, it is also possible that when tagging is completed as an image is captured, the image can be automatically uploaded to the SNS site. Also, tagged image data can be uploaded to a pre-set SNS site at a certain period or at a pre-set date.

As so far described, in the mobile terminal according to exemplary embodiments of the present invention, when an image is captured, information such as a person's name, a schedule, an anniversary, a location, weather condition, and the like, can be tagged to the captured image. Also, the tag inputted to the captured image can be edited. In addition, something to be posted to a message board can be uploaded to a community site by using the tagged captured image.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of controlling a mobile terminal, the method comprising:
    displaying an image on a touch screen display unit of the mobile terminal;
    displaying, via the touch screen display unit, tag information comprising a weather condition related to the image;
    displaying, via the touch screen display unit, a menu list in response to receiving a tag editing request for editing the tag information;
    displaying, via the touch screen display unit, a weather menu list comprising a plurality of weather items corresponding to different weather conditions in response to receiving a weather condition editing request for editing the weather condition in the tag information, wherein the weather condition editing request is received based on a touch input applied to the menu list displayed on the touch screen display unit;
    receiving, via the touch screen display unit, a selection of a weather item among the plurality of weather items; and
    displaying, via the touch screen display unit, a selected weather condition corresponding to the selected weather item, wherein the selected weather condition is changed from the weather condition in the tag information based on the selection of the weather item.

2. The method of claim 1, wherein the tag information is only displayed when a tag function on the mobile terminal is activated.

3. The method of claim 1, wherein the image is captured via a camera on the mobile terminal.

4. The method of claim 1, wherein the image is stored in a memory of the mobile terminal.

5. The method of claim 1, wherein the image is selected from an image album on the mobile terminal.

6. The method of claim 1, wherein the tag information is overlapped by the image displayed on the touch screen display unit.

7. A mobile terminal, comprising:
    a touch screen display unit configured to display an image; and
    a controller configured to:
    control the touch screen display unit to display tag information comprising a weather condition related to the image,
    control the touch screen display unit to display a menu list in response to receiving a tag editing request for editing the tag information,
    control the touch screen display unit to display a weather menu list comprising a plurality of weather items corresponding to different weather conditions in response to receiving a weather condition editing request for editing the weather condition in the tag information, wherein the weather condition editing request is received based on a touch input applied to the menu list displayed on the touch screen display unit, receive a selection of a weather item among the plurality of weather items, and display a selected weather condition corresponding to the selected weather item on the touch screen display unit, wherein the selected weather condition is changed from the weather condition in the tag information based on the selection of the weather item.

8. The mobile terminal of claim 7, wherein the controller is further configured to:

receive an edit selection signal indicating the tag information has been selected, and execute a tag editing mode for changing the tag information.

9. The mobile terminal of claim 7, wherein the controller is further configured to:

control the touch screen display unit to display the tag information only when a tag function on the mobile terminal is activated.

10. The mobile terminal of claim 7, wherein the image is selected from an image album on the mobile terminal.

11. The method of claim 1, wherein the weather condition related to the image is acquired from at least one of a site providing weather information and a weather condition widget.

12. The method of claim 1, wherein the different weather conditions include at least one of sunny, cloudy, mostly sunny, partly cloudy, rainy and windy.

13. The method of claim 2, wherein the tag information comprising the weather condition is displayed if the tag function for displaying the tag information comprising the weather condition is activated.

14. The method of claim 13, wherein the tag function for displaying the tag information comprising the weather condition is activated based on a touch input applied to a graphical object displayed on the touch screen display unit.

15. The method of claim 14, wherein the graphical object is a check box for activating or de-activating the tag function for displaying the tag information comprising the weather condition.

16. The mobile terminal of claim 7, wherein the different weather conditions include at least one of sunny, cloudy, mostly sunny, partly cloudy, rainy and windy.

17. The mobile terminal of claim 9, wherein the tag information comprising the weather condition is displayed if the tag function for displaying the tag information comprising the weather condition is activated.

18. The mobile terminal of claim 17, wherein the tag function for displaying the tag information comprising the weather condition is activated based on a touch input applied to a graphical object displayed on the touch screen display unit.

19. The mobile terminal of claim 18, wherein the graphical object is a check box for activating or de-activating the tag function for displaying the tag information comprising the weather condition.

* * * * *